United States Patent [19]

Beaudoin

[11] Patent Number: 4,584,352

[45] Date of Patent: Apr. 22, 1986

[54] PROCESS FOR POLYMERIZING POLY-OXAZOLINE IN AN ETHYLBENZENE DILUENT

[75] Inventor: Daniel A. Beaudoin, Midland, Mich.

[73] Assignee: The Dow Chemical Company, Midland, Mich.

[21] Appl. No.: 697,299

[22] Filed: Feb. 1, 1985

[51] Int. Cl.$^4$ .............................................. C08G 73/00
[52] U.S. Cl. .................................... 525/410; 525/540; 528/271; 528/408
[58] Field of Search ................ 525/410, 540; 528/271, 528/408

[56] References Cited

U.S. PATENT DOCUMENTS 4,087,413  5/1978  Kelyman .............................. 525/410

Primary Examiner—Harold D. Anderson
Attorney, Agent, or Firm—D. L. Corneglio

[57] ABSTRACT

Process for the polymerization of poly-2-alkyl-2-oxazoline characterized by employing ethylbenzene as the diluent. The ethylbenzene comprises from zero to about 40 percent by weight total polymer of the polymerization mixture. This process allows styrene polymerization equipment to be employed to polymerize poly-2-alkyl-2-oxazoline.

8 Claims, No Drawings

PROCESS FOR POLYMERIZING POLY-OXAZOLINE IN AN ETHYLBENZENE DILUENT

BACKGROUND OF THE INVENTION

This invention relates to a process for polymerizing poly-2-alkyl-2-oxazoline (hereinafter poly-oxazoline) in an ethylbenzene diluent.

Typically, in the polymerization of poly-oxazolines as with other polymers, it is generally desirable to employ a solvent or diluent to prevent total polymerization of the ingredients and thus plug the polymerization train. As it is necessary to be able to transport the polymer between reactors and storage tanks, usually by pipes, a solvent or diluent is included to maintain a sufficient viscosity of the polymer to facilitate flow. Another consideration is that the diluent or solvent be easily extracted from the polymer once processing is complete.

Generally, the solvent or diluent is chosen such that it is compatible with the polymer to prevent phase separation. Thus, aromatic-type solvents or diluents are chosen for aromatic-type polymers and alkenyl-type solvents or diluents are chosen for alkenyl-type polymers.

Ethyl acetate has long been the solvent of choice for the polymerization of 2-alkyl-2-oxazoline monomer into poly-2-alkyl-2-oxazoline. Unfortunately, ethyl acetate was too volatile to be smoothly removed from the polymer, especially when utilizing polymerization equipment designed for polymerizing styrene. Chlorobenzene has suitable volatility but has unacceptable corrosive properties and is an aromatic-type solvent whereas poly-2-alkyl-2-oxazolines are not aromatic-type polymers.

SUMMARY OF THE INVENTION

The present invention provides for a process for the polymerization of poly-2-alkyl-2-oxazoline characterized by employing ethylbenzene as the diluent. In the process, the ethylbenzene comprises from zero to about 40 percent by weight total polymer of the polymerization mixture. The preferred poly-2-alkyl-2-oxazoline is poly-2-ethyl-2-oxazoline.

The present invention further provides for a process for the polymerization of poly-2-alkyl-2-oxazoline with styrene polymerization equipment characterized by employing ethylbenzene as the diluent. This process employs ethylbenzene from about zero to about 40 percent by weight total polymer of the polymerization mixture. A preferred poly-2-alkyl-2-oxazoline is poly-2-ethyl-2-oxazoline.

Unexpectedly, ethylbenzene has been found to function well as an inert diluent, producing homogeneous solutions in poly-2-alkyl-2-oxazoline despite ethylbenzene being an aromatic-type solvent. Advantageously the discovery that ethylbenzene can be employed in the polymerization of poly-oxazolines allows styrene polymerization equipment to be employed to polymerize poly-oxazolines because styrene is typically polymerized with ethylbenzene as the diluent or solvent and; therefore, the styrene polymerization equipment (devolatilizer, etc.) are compatible with ethylbenzene.

DETAILED DESCRIPTION OF THE INVENTION

The present invention is directed toward processes where ethylbenzene is employed as the diluent in the polymerization of poly-oxazolines. The use of ethylbenzene as a diluent allows for the polymerization of 2-alkyl-2-oxazoline in polymerization equipment originally designed for polymerizing styrene and therefore greatly simplifies the production of poly-oxazolines.

Poly-oxazolines, generally, have molecular weights ranging from about 1,000 to 1,000,000 and can be characterized by random units of the structural formula (I):

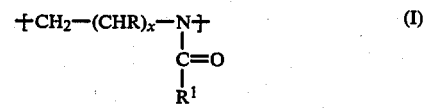

wherein R is typically a hydrogen or $C_1$–$C_3$ alkyl; $R^1$ is typically hydrogen, phenyl alkyl having up to about 18 carbon atoms or an inertly-substituted derivative thereof and x is 1 or 2. A preferred poly-2-alkyl-2-oxazoline is poly-2-ethyl-2-oxazoline (hereinafter, polyethyloxazoline or PEOx).

The poly-oxazoline polymers, as used herein, are compounds consisting of randomly-joined units (I) and are readily prepared by the ring-opening polymerization of 2-oxazolines or like compounds characterized by the structural formula (II):

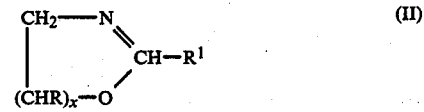

The ring-opening polymerization of 2-oxazoline monomers is generally conducted in the presence of a cationic polymerization catalyst at a reaction temperature of about 0° C.–200° C. Typical catalysts include strong mineral acids, organic sulfonic acids and their esters, acidic salts such as ammonium sulfate, Lewis acids such as aluminum trichloride, stannous tetrachloride, boron trifluoride and organic diazoniumfluoroborates, dialkyl sulfates, methyl tosylate and other like catalysts. This ring-opening polymerization is further described by Tomalia et al., *J. Polymer Science*, 4, 2253 (1966); Bassiri et al., *Polymer Letters*, 5, 871 (1967); Seeliger, Ger. 1,206,585; Jones and Roth, U.S. Pat. No. 3,640,909; Litt et al., U.S. Pat. No. 3,483,141 and Lalk et al., U.S. Pat. No. 4,376,861, all herein incorporated by reference.

The subject processes of polymerizing poly-oxazolines are characterized by employing ethylbenzene as a diluent. Ethylbenzene has the advantages of being an inexpensive, non-corrosive solvent with low toxicity, low flammability and a vapor pressure near that of PEOx.

The level at which ethylbenzene can be advantageously employed in the polymerization mixture of 2-alkyl-2-oxazoline is from zero to about 40 percent by weight total polymer, i.e., up to about 40 percent by weight total polymer. Generally, ethylbenzene is employed from about 10 to about 40 percent by weight polymer with the most preferred levels being below about 25 percent by weight polymer. At levels higher than about 40 percent by weight total polymer of the polymerization mixture a phase separation can occur which is not desirable.

The amount of ethylbenzene that may be employed as a diluent in the polymerization of 2-alkyl-2-oxazoline is observed by preparing several ampule polymerizations of PEOx at various levels of ethylbenzene. The ampules were observed as to whether a phase separation had occurred between the diluent, ethylbenzene, and the polymerized PEOx. The results were as follows:

| Ethylbenzene (Weight Percent) | Comments |
| --- | --- |
| 9.97 | one phase, yellow, clear |
| 19.93 | one phase, yellow, clear |
| 29.91 | one phase, yellow, cloudy |
| 39.86 | one phase, yellow, cloudy |
| 49.88 | two phase, 65 percent yellow cloudy polymer, 35 percent clear liquid |
| 69.89 | two phase, 5 percent yellow cloudy polymer, 95 percent clear liquid |
| 89.91 | no polymer phase, clear |

In order to demonstrate the subject invention, the following general procedure was carried out to polymerize PEOx with ethylbenzene as the diluent.

PROCEDURE

Methyl tosylate, ethylbenzene and 2-ethyl-2-oxazoline were continuously fed into an agitated reactor in desired proportions. The reactor was run to achieve the desired conversion of monomer to polymer and then the polymer was transferred by piping to a second reactor to allow complete polymerization. The polymer solution was then transferred to a devolatilizer to remove any unconverted 2-ethyl-2-oxazoline and ethylbenzene. The polymer was then collected.

EXAMPLE I

Employing the general procedure, 10 percent ethylbenzene, 90 percent 2-ethyl-2-oxazoline, 1880 parts per million (ppm) methyl tosylate, and approximately 20 ppm water were charged to a reactor. The polymerization was conducted and produced a greater than 99 percent yield of PEOx having a molecular weight of 200,000.

EXAMPLE II

Employing the general procedure, 20 percent ethylbenzene, 80 percent 2-ethyl-2-oxazoline, 1880 ppm methyl tosylate and approximately 20 ppm water were charged to a reactor. The polymerization was conducted and produced a greater than 99 percent yield of PEOx having a molecular weight of 200,000.

EXAMPLE III

Employing the general procedure, 20 percent ethylbenzene, 80 percent 2-ethyl-2-oxazoline, 450 ppm methyl tosylate and approximately 20 ppm water were charged to a reactor. The polymerization was conducted and produced a greater than 99 percent yield of PEOx having a molecular weight of 400,000.

EXAMPLE IV

Employing the general procedure, 20 percent ethylbenzene, 80 percent 2-ethyl-2-oxazoline, 2680 ppm methyl tosylate and approximately 20 ppm water were charged to a reactor. The polymerization was conducted and produced a greater than 99 percent yield of PEOx having a molecular weight of 50,000.

What is claimed is:

1. A process for the polymerization of poly-2-alkyl-2-oxazoline characterized by employing ethylbenzene as the diluent.
2. The process of claim 1 where said poly-2-alkyl-2-oxazoline is poly-2-ethyl-2-oxazoline.
3. The process of claim 1 where said ethylbenzene comprises up to about 40 percent by weight based on total polymer.
4. The process of claim 3 where said ethylbenzene is present in an amount below about 25 percent by weight based on total polymer.
5. A process for the polymerization of poly-2-alkyl-2-oxazoline with styrene polymerization equipment characterized by employing ethylbenzene as the diluent.
6. The process of claim 5 where said poly-2-alkyl-2-oxazoline is poly-2-ethyl-2-oxazoline.
7. The process of claim 5 where said ethylbenzene comprises up to about 40 percent by weight based on total polymer.
8. The process of claim 7 where said ethylbenzene is present in an amount below about 25 percent by weight based on total polymer.

* * * * *